S. G. CRANE.
ELECTRIC HEATER.
APPLICATION FILED SEPT. 12, 1914.

1,178,057.

Patented Apr. 4, 1916.
4 SHEETS—SHEET 1.

WITNESSES:—

INVENTOR
Samuel G. Crane
by
Owen, Owen & Crampton

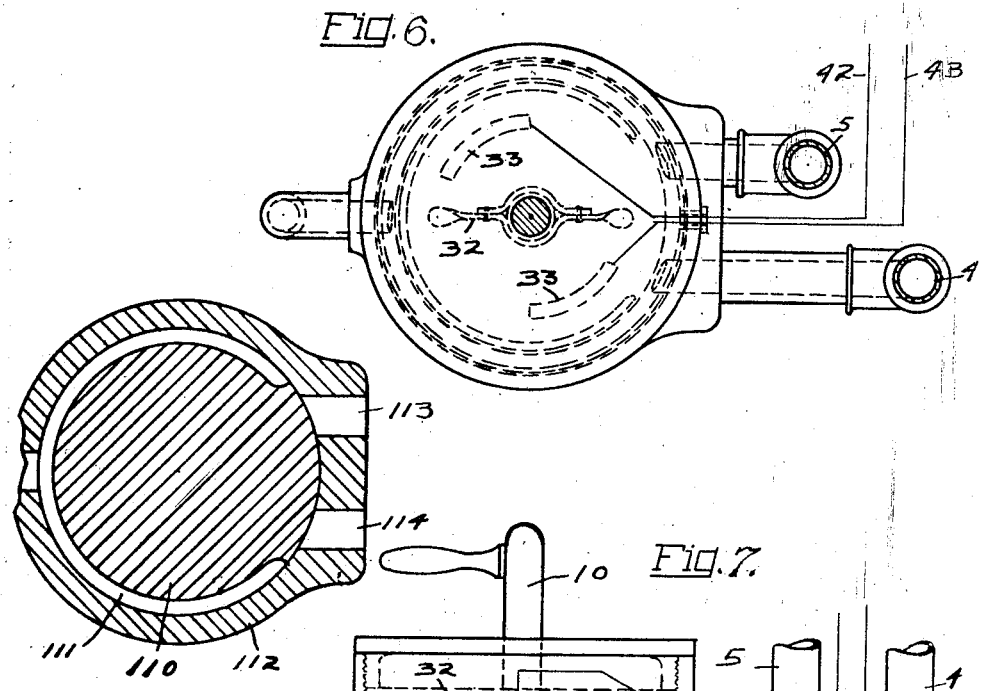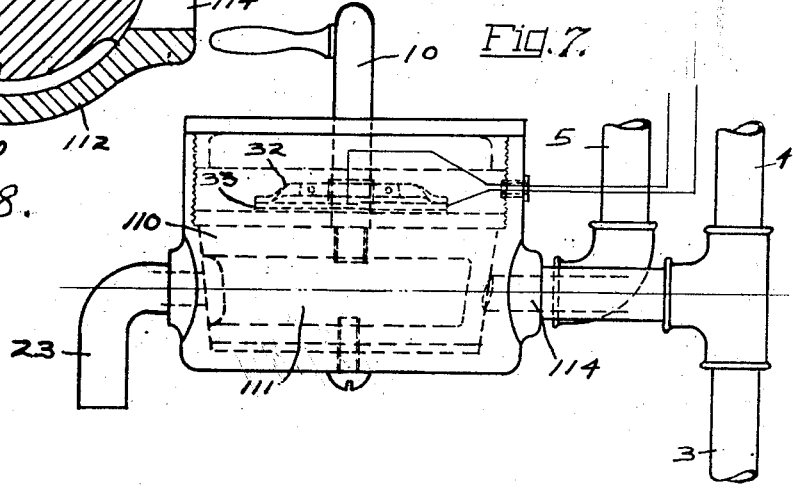

UNITED STATES PATENT OFFICE.

SAMUEL G. CRANE, OF TOLEDO, OHIO.

ELECTRIC HEATER.

1,178,057. Specification of Letters Patent. Patented Apr. 4, 1916.

Application filed September 12, 1914. Serial No. 861,406.

*To all whom it may concern:*

Be it known that I, SAMUEL G. CRANE, a citizen of the United States, and a resident of Toledo, in the county of Lucas and State of Ohio, have invented a certain new and useful Electric Heater; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to liquid heaters.

It particularly relates to automatically controlled electric heaters.

The object of the invention is to provide an efficient and economic means for heating a liquid, such as water, as fast as it is drawn from the supply.

It also has for its object to provide automatic controlling devices which cause the heater to produce the temperature desired notwithstanding the variable temperature at which the water, or other fluid is supplied to the heater.

The invention may be contained in many forms of constructions usable for different purposes, all of which come within the purview of my claims hereinafter appended. To show the practicability of my invention, I have selected one of such constructions as an example and shall describe it hereinafter. The construction selected is illustrated in the accompanying drawings.

Figure 1:
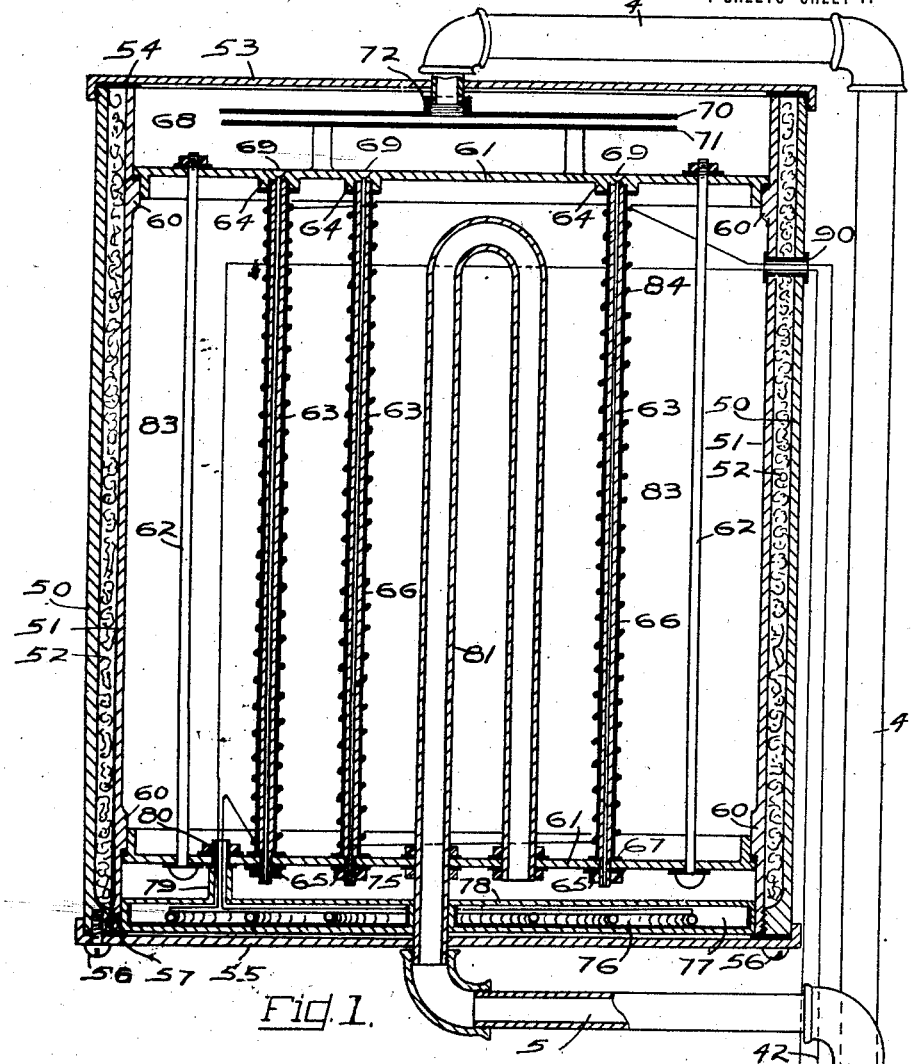
Figure 2:
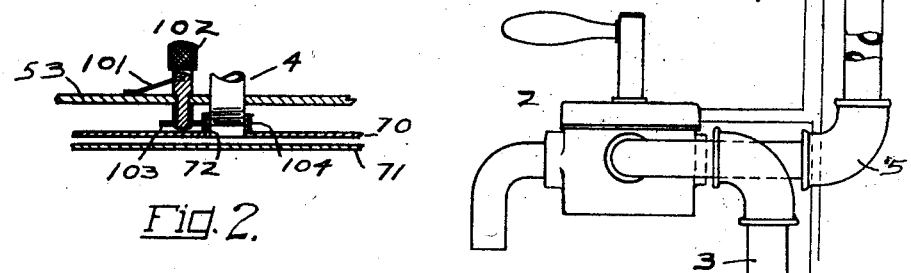
Figure 3:
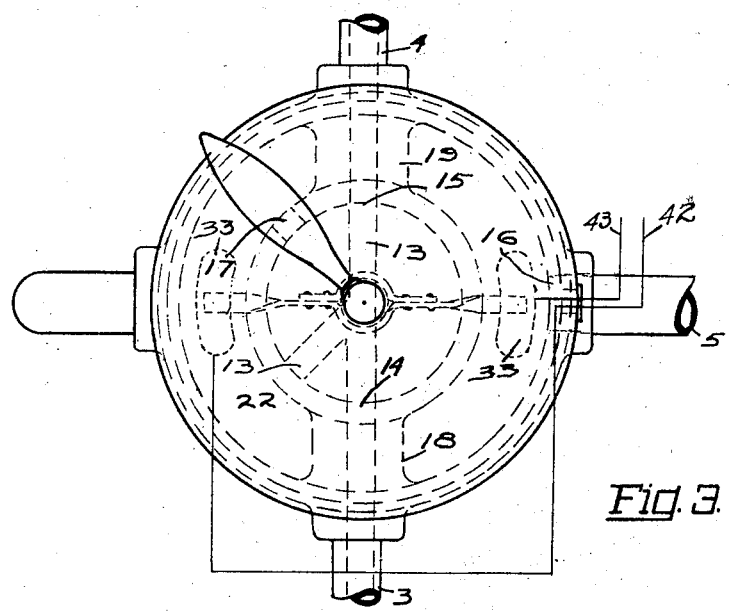
Figure 4:
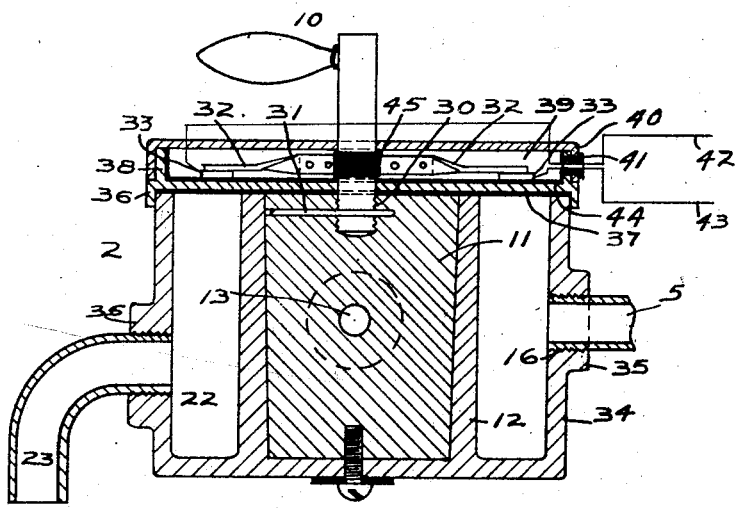
Figure 5:
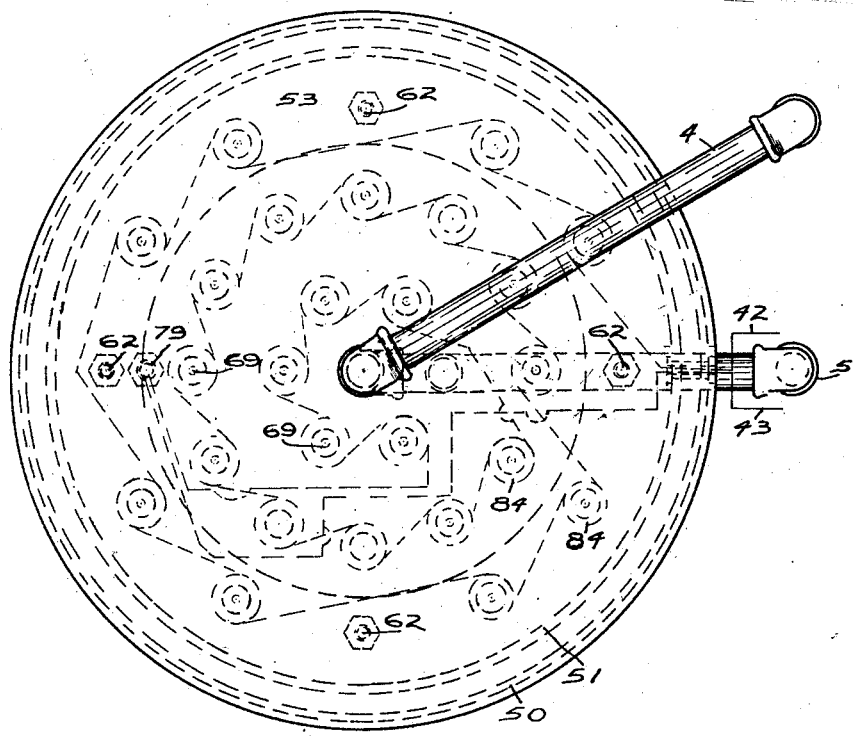

Figure 1 is a sectional view of the fluid heater showing its connection with a combined electric and fluid controller. Fig. 2 is a sectional view of a distributer used for regulating the fluid supply and for distributing the water to the heaters. Figs. 3 and 4 are respectively top and sectional views of the combined electric and fluid controller. Fig. 5 is a top view of the electric heater. Figs. 6, 7 and 8 are respectively, top, side and sectional views of the modified form of a combined fluid and electric controller.

Referring to the diagrammatic Figs. 1 and 2, 1 is the heater, 2 is the faucet and switch, 3 is the main supply pipe, 4 is the pipe for feeding water to the heater 1 and 5 is the pipe which conducts the heated water from the heater 1 to the electric fluid controller.

The water flows to the faucet through the main supply pipe 3 and then passes through the faucet and then to the heater through the pipe 4. The water, as it leaves the heater passes through the pipe 5 back to the faucet. The faucet is thus located intermediate the main and the heater and controls the supply of the fluid from the main to the heater. The water may thus be cut off in advance of the heater so that when the desired quantity of water has been heated, the supply of the water to the heater may be cut off and all of the water that may remain in the heater and the pipe 5 is drawn from the heater. When it is desired to heat more water, there will be practically no water left in the heater and the connecting pipe to be drawn off before receiving the hot water. As soon as the water begins to flow it will have the required temperature.

The combined faucet and switch 2 is provided with a cock 10 having a plug 11 located in a cylindrical cell 12 formed coaxially in the casing 34. The plug 11 is provided with a Y-passageway 13 which leads diametrically through the plug 11 and also radially from the center of the plug at an angle to the diametric passage. The Y-passageway is adapted to register with the openings 14, 15 and 17, formed in the wall of the cell 12. The openings or passageways 14 and 15 extend through the bosses 18 and 19 which communicate with the pipes 3 and 4. When the diametrical portion of the Y-passageway 13 registers with the openings 14 and 15, the water flows directly from the feed pipe 3 through the faucet 2 and pipe 4 to the heater 1. It returns to the faucet through the pipe 5 which communicates with the chamber 22 formed in the interior of the casing 34 around the cell 12. The water passes through the chamber 22 and out through the faucet mouth 23. When the Y-passageway 13 in the plug 11 registers with the hole 17 which is formed in the wall of the cell 12 and with the opening 14, the water flows directly from the feed pipe 3 into the chamber 22 and out through the mouth 23, while the opening 15 which communicates with the pipe 4 is cut off by the rotation of the plug 11. The cock stem 10 may be threaded at its lower end 30 and provided with a locking washer or strip 31 to prevent unscrewing of the cock 10.

In my invention, a means is provided for not only controlling the fluid flow to and from the heater, but also, for controlling the electric current supply. The combined faucet and switch is divided into two chambers, one through which the fluid may pass and the other which contains switch contacts and has a means for permitting the flow of an electric current through the heater.

In the form of the invention shown in Figs. 3 and 4, a pair of contact arms 32 are secured to the shank of the cock 10. They may be disposed on opposite sides of the shank if desired. The arm 32 is movable with the shank of the cock 10 and operates when in a certain position to bridge the arcuate fixed contacts 33, which form the terminals of the circuit of the heater and the source of current supply. When the cock is so disposed as to place the arms 32 across the contacts 33 the plug 11 is so disposed as to place the duct 13 in register with the holes in the cell wall 12 communicating with the pipes 3 and 4. The upper end of the casing 34 is closed by a threaded cap 36. A suitable packing material 37 is located between the cap 36 and the wall of the casing 34 to prevent leakage of the water or other fluid. The cap 36 is provided with a side wall 38 forming a cavity 39 which is closed by a cover 40 which may be secured by means of threads or may be tightly fitted over or secured in any other suitable way to the cap 36. The switch contacts are located in the cavity 39. A duct insulator 41 extends through the side wall 38 of the cap 36. The wires 42—43, extend through the insulator 41. The interior surface of the cavity 39 is covered by a suitable insulating material such as fiber 44, and the arms 32 are clamped about an insulating collar 45 located upon the stem of the cock 10. The faucet is thus made practically leak-proof and also the parts of the switch are thoroughly insulated. When the cock 10 is turned so as to close the switch arm 32 and allow the water to pass through the pipes 3, 4 and 5, the electric current passes through the wires 42 and 43 and through the heat elements of the electric heater.

The heater 1 is provided with a double heat insulating inclosing wall consisting of the two coaxial cylindrical shells 50 and 51. An asbestos or mineral wool packing is located between the two walls of the heater. The upper end of the heater 1 is closed by the cover 53 which is threaded on and closes the upper end of the heater 1. A suitable packing ring 54 may be located between the upper edge of the heater and the periphery of the cover 53. The bottom of the heater is closed by the plate 55 which is locked to the wall 50 by means of the screws 56. A suitable packing ring 57 may be located between the lower edge of the cylinder 50 and the periphery of the plate 55. The inner wall 51 of the heater is provided with shoulders 60 against which the plate disks 61, located in the upper and lower ends of the heater, are drawn by means of the tie rods 62.

The plates 61 divide the interior of the heater into three chambers, the upper chamber 68, the lower chamber 75, and the intermediate chamber 83. The upper chamber receives the liquid to be heated and contains a regulator or distributer for controlling the liquid operated upon by the heater. The intermediate chamber contains the automatic thermally controlled liquid conveyers and heaters which heat the liquid and cause it to increase in rate of flow as it is heated. The chamber being heated by the electric heaters, operates to a more or less extent to remove the chill from the water in the upper chamber 68. The lowermost chamber 75 contains a heating element, such as, a hot plate, which gives the final heat to the water. It superheats the water received from the electric heaters located in the chamber 83. It may also have connected therewith means for raising the temperature of the water to near boiling point. The particular means shown, consists of a siphon which operates to delay the initial outflow of the water.

The regulator or distributer located in the uppermost chamber regulates the flow of the water through the heater according to the temperature of the water received and the temperature desired and also to the capacity of the heater. It distributes the water over the upper plate 61 and the ends of the conveyer tubes 63 and prevents any local currents or uneven pressures through the automatic electric thermo-controlled fluid heaters.

The regulator or distributer consists of two plates 70 and 71 disposed in parallel relation to each other. The plate 70 is provided with an opening 72 which extends through a boss located centrally. The plate 70 is connected with the pipe 4 through which the water will pass, when the faucet is open, into and between the plates 70 and 71. The water will thereby be directed radially and over the periphery of the plate 71 into the chamber 68 and onto the plate 61, that is, to the outer edge of the plate 61, whence it will flow centrally from the larger area to the smaller as it is taken up by the conveyer tubes. The plate 70 may be adjusted relative to the plate 71 by the rotation of the plate 70, the threads causing a corresponding change in the distance between the plates. The greater the distance between the plates the greater will be the flow of the water into the heater as this will reduce the back pressure. The adjustment of the regulator and distributer contained in the chamber 68 may be more or less permanent in character and may depend upon the average temperature of the water received during any particular season of the year or other period of time.

The combined heaters and means for automatically controlling the rate of flow of the water according to the temperature to which it is heated by the heaters are located intermediate the plates 61. The upper ends of the heat elements 63 set into downwardly opening sockets 64 located in the upper plate 61. The lower ends of the tubes 63 are locked in position by means of the nuts 65 which press the lower plate 61 against shoulders formed on the lower ends of the heat elements. The ends of the rods may also be provided with washers 67 which will operate to seal the space between the upper and lower plates 61 and prevent fluid from penetrating between the said plates except, as it passes through the bore of the tubes 63. The upper ends of the tubes 63 communicate with the chamber formed between the top 53 of the heater 51 and the upper plate 61 by means of conically formed openings 69 which register with the bore through the tubes. The tube having a small bore is placed centrally with respect to the resistance wire 84. The wire 84 is suitably insulated from the tube, if the tube is made of metal. The tube may be covered with a suitable insulating material. It may be covered with a vitreous material in which the coils may be totally or partially embedded. The bore of each tube is preferably capillaric. The total effective interior sectional area of the capillary tubes approximates the size of the pipes 4 and 5. The total area of the tubes is such that the flow therethrough and the inlet pipe is thereby greatly retarded. As the multiplicity of tubes become heated and expanded and the water becomes heated, increasing the mobility of the water thereby, the rate of flow of the water increases. The rate of flow will therefore depend upon the heat produced and transmitted from the coils to the water so that if the water is received cold it will flow comparatively slow through the capillary tubes until the water and the air contained in the water and tubes become heated. The construction is such that if cold water is supplied to the upper chamber and no heat is applied thereto it will take a considerable time for its passage through the capillary tubes and that if the capillary tubes and the water contained therein are heated to a slight extent the rate of flow will be slightly accelerated and if heated to a higher temperature the rate of flow will be correspondingly faster so that the rate of flow of the water through the capillary tubes is substantially in proportion to its increase in temperature.

The chamber 75 is provided with an electric heat coil 76 which is spirally wound and disposed in a closed cell 77. The cell 77 is located in the lower end of the chamber 75 and as the water passes through the tubes 63 it passes on to the surface 78 of the hot plate or cell 77. The wires connecting the heat coil contained in the cell 77 extend through a tube 79 which passes through the plate 61 and is locked in position by the nut 80 which clamps the plate 61 and a pair of insulating and sealing washers around the tube 79 on which it is threaded.

The fluid thermostatic regulator consists of the siphon 81 which extends up through the lower plate 61 into the chamber 83 and down through the chamber 75 and communicates with the pipe 5. The water when it is sufficiently heated, will be forced up through one leg of the U-tube 81 and then down through the other leg of the siphon to the pipe 5. It will continue to siphon the water from the heater as fast as it is supplied to the chamber 75. After the water begins to flow through the siphon the rate of flow of the water through it will depend upon the rate of flow of the water through the tubes 63. The weight of the water in the delivery leg of the siphon also tends to increase the rate of flow of the water through the heating tubes 63. The siphon operating to delay the delivery of water at first gives time for the heat coils 76 to raise the temperature of the water.

The electric circuit extends from any suitable source of supply to the combined faucet and switch. In the heater, the current passes through the heat coils 84 and 76 in series and thence it passes to the source of supply. The connections are made through the wires 42 and 43.

The regulator shown in Fig. 6 is provided with a pointer which may be used to indicate approximately the temperature at which the water will be heated or the temperature at which the adjustment must be made in order that the water may be heated by the heater to a fixed degree up to about 212°, according to the markings placed upon the indicator. If graduations of final temperature are made on the indicator and if the water supplied to the heater is substantially uniform in temperature, the regulator may be so adjusted as to produce the desired temperature in the water, or if graduations approximating the initial temperature of water are made and if it is desired to obtain a uniform temperature and the water supplied to the heater varies in temperature, the adjustment may be varied accordingly.

The indicator has a pointer 101 which may be moved over the top 53 of the heater by means of a gnarled headed pin 102 to which the pointer is secured. A scale may be formed on the plate 53 or may be attached or connected therewith in any suitable way. The pin 102 is properly bushed and sealed to prevent leakage of the heater around the pin. A small gear wheel 103 is secured to the lower end of the pin 102. It operates upon the gear teeth 104 formed on the boss or hub 72 of the plate 70. The interior of the hub 72 being threaded on the lower end of the pipe 4, the plate 70 will be shifted axially when the gnarled head 102 is rotated. The ratio of the gear wheel 103 and the gear formed on the boss 72 may be varied, according to the pitch of the thread in the hub 72 and on the end of the pipe 4, so as to produce the desired number of rotations of the plate 70 with respect to the pitch of the thread formed in the hub 72 of the plate 70, so as to produce the desired movements of the plate 70 with respect to the plate 71 and thereby bring about the desired adjustment according to the angular movements of the pointer 101.

The distributer causes the water to be retarded as it enters the heater so as to give the heater opportunity to heat the water before it passes from the heater and to adjust the pressure of the water in the upper chamber of the heater that may be transmitted from the connecting pipe 4. The automatic heat regulators which heat and convey the fluid from the upper to the lower chambers of the heater will thus be more or less controlled by the regulator in the upper chamber of the heater inasmuch as the regulator in the upper chamber regulates to a certain extent the pressure of the fluid in the heater.

In the form of the combined faucet and switch shown in Figs. 8, 9 and 10, the plug 110 is provided with a peripheral groove 111 which extends circumferentially around a greater portion of the plug. The casing 112 is provided with inlet openings 113 and 114 through which the faucet is connected to the feed pipe 3 and to the pipe 5 which connects with the heater 1. The ports 113 and 114 are controlled by the plug 110 having the groove 111. When the plug 110 is turned by the cock 10 in one direction the end of the peripheral groove 111 registers with the port 114, which allows cold water to pass through the peripheral groove 111 out through the mouth 23. If the cock 10 is turned in the opposite direction the other end of the groove 110 registers with the inlet port 113 which communicates with the heater pipe 5. The heated water from the heater will then pass through the groove 111 and out through the mouth 23 of the faucet. If it is desired to mix the waters coming from the heater and from the feed pipe 3 to cool the water from the heater to any desired temperature, the faucet may be turned so as to cause the end portion of the groove 111 to cover or register with both ports 113 and 114. The end of the groove may be so located as to vary the amount of cool water which enters the groove by varying the location of the end of the groove 111 with respect to the opening or port 114. On the other hand if it is desired to warm the water passing from the feed pipe 3 it may be done by turning the cock 10 and the plug 110 around so that the other end of the groove 111 will cover to a more or less extent the inlet port 113. This will operate to warm the water from the feed pipe 3 as may be desired by allowing more or less of the water from the inlet port 113 from the heater to flow into the groove 111. The arm 32 and the contacts 34 make connection with the source of current and the heater through the wires 42 and 43. The contacts 33 are of such length and are so located with respect to the location of the arm 32 that the water will be heated when either end of the groove 111 registers with or covers the port 113 which will bring into operation the heater.

The construction selected and described, may be greatly varied in the arrangement and manufacture of its parts and in the substitution of elements having equivalent functions, and, such modifications, may be used for many varied purposes and still contain my invention.

Having thus described my invention, what I claim as new, and desire to secure by Letters Patent, is,—

1. In combination with a source of supply of a liquid under pressure, an electric heater having a liquid supply controller located intermediate the electric heater and the source of supply, a plurality of electric heat elements forming liquid conveyers, a distributer for distributing the liquid over the ends of the conveyers and means for thermally controlling the flow of the liquid from the electric heater.

2. In an electric heater for heating a flowing liquid, having a plurality of capillary tubes and means for heating the capillary tubes, the said capillary tubes adapted to permit the flow of the liquid in proportion to the temperature to which it is heated by the heating means.

3. In a liquid heater, means for supplying liquid at a low temperature thereto, an outlet for the liquid therefrom, means for heating the liquid and capillary conducting means arranged in the path of flow of the liquid for permitting an increase of the flow of the liquid in proportion to its increase in temperature.

4. In a liquid heater, an inlet and outlet a heating chamber arranged between the inlet and outlet, and capillary means for conducting the liquid through the heating chamber whereby the passage of the liquid at low temperature is retarded and the rate of flow of heated liquid accelerated in proportion to its increase in temperature.

5. In a liquid heater, means for supplying relatively cool liquid under pressure, an outlet capillary means arranged between the supply means and outlet for retarding the flow of relatively cool liquid and a heating means applied to the retarding means whereby the liquid is heated and its rate of flow to the outlet increased proportionately to its increase in temperature.

6. In a liquid heater, an inlet, an outlet, heating means arranged between the inlet and outlet and capillary means for conducting the liquid through the heating means whereby the rate of flow of liquid to the outlet varies proportionately to the variations in the temperature of the liquid.

7. In a liquid heater, an inlet chamber for relatively cool liquid, a delivery chamber, a plurality of capillary tubes, connecting the inlet and outlet chambers whereby the flow of relatively cool liquid to the outlet chamber is retarded and means for supplying heat to the liquid in the capillary tubes whereby the temperature and rate of flow of the liquid are correspondingly increased.

8. In a liquid heater, an inlet chamber, a delivery chamber, a central heating chamber, a series of capillary tubes arranged in the central heating chamber and connecting the inlet chamber with the delivery chamber, said capillary tubes allowing the passage of the liquid therethrough in proportion to the temperature of the liquid and means for applying heat to the liquid during its passage through the capillary tubes.

9. In a device for heating flowing liquid, a heating chamber, an inlet pipe for conducting liquid to the heating chamber, a series of small bore tubes arranged within the heating chamber, the total conducting capacity of the series of tubes being substantially equal to the conducting capacity of the inlet pipe, means within the heating chamber for applying heat to the liquid while flowing through said tubes and an outlet for the heated liquid.

10. In a device for heating flowing liquid, a heating chamber, an inlet pipe for conducting liquid under pressure to the heating chamber, means arranged within the heating chamber for partially stopping the flow of liquid and comprising a plurality of capillary tubes, electrical means for heating the liquid while so retarded including heat elements surrounding the tubes and an outlet for the heated liquid.

11. In a liquid heater, means for admitting liquid under pressure, an outlet for the liquid, a series of capillary tubes arranged in the path of flow of the liquid and electrical means for applying heat to the liquid while flowing through said tubes.

In testimony whereof, I have hereunto signed my name to this specification in the presence of two subscribing witnesses.

SAMUEL G. CRANE.

Witnesses:
  F. E. AUL,
  R. G. ALLEN.